United States Patent
Balk et al.

(10) Patent No.: US 8,034,879 B2
(45) Date of Patent: Oct. 11, 2011

(54) METHOD FOR PREPARATION OF PENTA-BLOCK COPOLYMERS WITH OH-FUNCTIONALIZED BLOCKS BASED ON (METH)ACRYLATE

(75) Inventors: Sven Balk, Frankfurt (DE); Gerd Loehden, Essen (DE); Holger Kautz, Haltern am See/Sythen (DE); Volker Erb, Duesseldorf (DE); Uwe Franken, Dormagen (DE); Georg Kinzelmann, Pulheim (DE); Thomas Moeller, Duesseldorf (DE)

(73) Assignees: Evonik Roehm GmbH, Darmstadt (DE); Henkel AG&Co. HGAA, Duesseldorf (DE)

( * ) Notice: Subject to any disclaimer, the term of this patent is extended or adjusted under 35 U.S.C. 154(b) by 0 days.

(21) Appl. No.: 12/674,552

(22) PCT Filed: Aug. 11, 2008

(86) PCT No.: PCT/EP2008/060520
§ 371 (c)(1), (2), (4) Date: Apr. 5, 2010

(87) PCT Pub. No.: WO2009/024495
PCT Pub. Date: Feb. 26, 2009

(65) Prior Publication Data
US 2011/0034623 A1  Feb. 10, 2011

(30) Foreign Application Priority Data
Aug. 21, 2007  (DE) .................... 10 2007 039 535

(51) Int. Cl.
*C08F 297/00* (2006.01)
*C08F 267/06* (2006.01)

(52) U.S. Cl. ........ 525/299; 525/245; 525/302; 525/303; 525/309

(58) Field of Classification Search .......... 525/242, 525/244, 245, 298, 299, 302, 303, 308, 309
See application file for complete search history.

(56) References Cited

U.S. PATENT DOCUMENTS

| 6,268,433 | B1 * | 7/2001 | Barkac et al. ........ 525/92 F |
| 2005/0085592 | A1 | 4/2005 | Taniguchi et al. |
| 2008/0207817 | A1 | 8/2008 | El Bounia |
| 2008/0262176 | A1 | 10/2008 | Loehden et al. |
| 2009/0062508 | A1 | 3/2009 | Balk et al. |
| 2009/0275707 | A1 | 11/2009 | Balk et al. |
| 2009/0312498 | A1 | 12/2009 | Balk et al. |
| 2009/0326163 | A1 | 12/2009 | Balk et al. |
| 2010/0010178 | A1 | 1/2010 | Balk et al. |

FOREIGN PATENT DOCUMENTS
EP  1 475 397  11/2004
WO  2006 106214  10/2006

OTHER PUBLICATIONS

Xu, Fu-Jian et al., "Pentablock Copolymers of Poly(Ethylene Glycol), Poly (2-Dimethyl Amino)Ethyl Methacrylate) and Poly(2-Hydroxyethyl Methacrylate) From Consecutive Atom Transfer Radical Polymerizations for Non-Viral Gene Delivery", Biomaterials, vol. 29, pp. 3023-3033 (Jul. 1, 2008) XP022647944.
U.S. Appl. No. 12/301,903, filed Nov. 21, 2008, Balk, et al.
U.S. Appl. No. 12/440,244, filed Mar. 6, 2009, Balk, et al.

* cited by examiner

*Primary Examiner* — Irina S Zemel
*Assistant Examiner* — Jeffrey Lenihan
(74) *Attorney, Agent, or Firm* — Oblon, Spivak, McClelland, Maier & Neustadt, L.L.P.

(57) ABSTRACT

The invention relates to a process for preparing CABAC or ACBCA pentablock copolymers based on (meth)acrylate with an OH functionalization of the A blocks.

44 Claims, No Drawings

METHOD FOR PREPARATION OF PENTA-BLOCK COPOLYMERS WITH OH-FUNCTIONALIZED BLOCKS BASED ON (METH)ACRYLATE

FIELD OF THE INVENTION

The invention relates to a further process for preparing CABAC or ACBCA pentablock copolymers based on (meth)acrylate with an OH functionalization of the A blocks and to the use thereof, for example as a formulation constituent of reactive hotmelt adhesives.

Tailored copolymers with defined composition, chain length, molar mass distribution, etc. are a wide field of research. One distinction which is drawn is that between gradient and block polymers. For such materials, various applications are conceivable. Some will be presented briefly hereinafter. For this purpose, some of the fields of use which have been selected are those in which polymers are used, from which the present invention is to be delimited.

Reactive adhesives are substances which are solid at room temperature. They are melted by heating and applied to a substrate. In the course of cooling, the adhesive composition solidifies again and hence binds the substrate. In addition, the polymers present in the adhesive composition crosslink as a result of reaction with moisture. This operation results in ultimate, irreversible hardening.

PRIOR ART

Such adhesives are described, for example, in U.S. Pat. No. 5,021,507. The main constituent of these adhesives is compounds with free isocyanate groups, which are usually obtained by condensation reaction of an excess of polyisocyanate groups with polyols. To improve the adhesion properties to particular substrates, binders consisting of polymers composed of ethylenically unsaturated monomers have been added to these compounds with free isocyanate groups. The binders used are typically polyalkyl (meth)acrylates with $C_1$- to $C_{20}$-alkyl groups. They are polymerized from the corresponding monomers by free radical polymerization either before the addition to the urethanes or in the presence thereof.

U.S. Pat. No. 5,866,656 and EP 1 036 103 describe reactive hotmelt adhesives in which the binders composed of poly(meth)acrylate are bonded covalently to the compounds with free isocyanate groups in the adhesive composition. Since this bonding is usually effected by a condensation reaction, such adhesives in which this bond has formed are referred to as adhesives at the condensation stage. The adhesives thus obtained, compared to those described in U.S. Pat. No. 5,021,507, are notable for an increased elasticity and an improved adhesion to particular metal substrates, and for a longer open time—the time available for processing.

However, these reactive hotmelt adhesives have considerable disadvantages. For example, they exhibit only a low initial strength. This results in a particularly long, disadvantageous fixing time after the application of the adhesive composition.

A further disadvantage of the prior art reactive adhesives is the high viscosity, which is relevant in the course of processing. As a result, processing of the molten reactive hotmelt adhesive, in particular the application to porous substrates, is complicated significantly. In some cases, gelation also occurs at the condensation stage.

A further disadvantage is that the extractable fraction in the hardened adhesive is quite high. Among other consequences, this reduces the resistance of the adhesive composition to solvents.

Another disadvantage is that the free-radically polymerized materials also comprise a relatively high proportion of low molecular weight constituents which do not take part in the crosslinking reactions and constitute the extractable fraction of corresponding reactive hotmelt adhesives.

Another kind of polymerization has brought the goal of tailored polymers a good deal closer. The ATRP (atom transfer radical polymerization) method was developed in the 1990s principally by Prof. Matyjaszewski (Matyjaszewski et al., J. Am. Chem. Soc., 1995, 117, p. 5614; WO 97/18247; Science, 1996, 272, p. 866) and especially with 2-hydroxyethyl (meth)acrylate (HEMA) (Beers et al., Macromolecules; 1999, 32, p. 5772-5776). The ATRP affords narrow-distribution (homo)polymers in the molar mass range of $M_n$=10 000-120 000 g/mol. A particular advantage is that both the molecular weight and the molecular weight distribution can be regulated. As a living polymerization, it also permits the controlled formation of polymer architectures, for example random copolymers or else block copolymer structures. By virtue of appropriate initiators, for example, unusual block copolymers and star polymers are additionally obtainable. Theoretical fundamentals of the polymerization mechanism are detailed, inter alia, in Hans Georg Elias, Makromoleküle [Macromolecules], volume 1, 6th edition, Weinheim 1999, p. 344.

The above-described problems have been solved in WO 05/047359 to the extent that use of a controlled polymerization method in the form of atom transfer radical polymerization (ATRP) allows binders with very narrow molecular weight distributions to be provided, which have only a low proportion of high molecular weight constituents compared to free-radically polymerized (meth)acrylates. In polymer mixtures, these constituents bring about especially an increase in the viscosity.

A disadvantage of the reactive adhesives detailed in WO 05/047359 is, however, a random distribution of the hydroxyl, mercapto and/or amine groups in the polymer chain of the binder. This leads to close-mesh crosslinking and hence to a reduced elasticity of the adhesive composition. This can also result in a deterioration of the substrate binding. This disadvantage comes to bear especially when polyisocyanates having more than two free isocyanate groups are used as a formulation constituent of the reactive hotmelt adhesive. For a list and description of the compounds which bear free isocyanate groups, reference is made to the relevant description in WO 05/047359.

For dispersions with low foam formation, gradient copolymers are prepared by living and controlled polymerization, for example, in DE 102 36 133 and DE 141 60 19. Gradient copolymers are copolymers which consist, for example, of monomers A and B, and in whose individual chains a gradient of the distribution of the monomer units along the chains exists. One chain end is high in monomer A and low in monomer B, the other end high in monomer B and low in monomer A. Gradient copolymers are delimited from block copolymers by the fluid transition between the monomers A and B.

Block polymers have an abrupt transition between the monomers in the polymer chain, which is defined as the boundary between the individual blocks. A customary synthesis method for AB block polymers is the controlled polymerization of monomer A and, at a later time, the addition of monomer B. In addition to sequential polymerization by batchwise addition to the reaction vessel, a similar result can also be achieved by, in the case of continuous addition of the two monomers, abruptly changing their compositions at different times. An abrupt change may also mean brief transition regions within which the two repeat units may be present in mixed form.

Suitable living and controlled polymerization methods are, as well as anionic or group transfer polymerization, also modern methods of controlled radical polymerization, for example RAFT polymerization. The mechanism of the RAFT polymerization is described in detail in WO 98/01478 or EP 0 910 587. Use examples are found in EP1 205 492.

In EP 1 375 605, AB block copolymers are prepared via the ATRP method. The polar component used is HEMA. This is intended to enable good compatibility with other substances.

WO 00/75791 prepares AB diblock copolymers from MMA and a mixture of n-BA and HEMA with monofunctionalized catalysts. The blocks are amine-functionalized. This results in discoloration and impairment of the odour. In addition, polymers with an AB diblock structure of this kind have a polarity difference between the chain ends which is undesired for the inventive applications.

EP 1475397 describes diblock and triblock copolymers of the AB and ABA form respectively, with at least one OH-functionalized block. US 2004 0147674 claims corresponding polymers and the formulation thereof with crystalline resins. Both documents concern copolymers with an acrylate and a harder (meth)acrylate composition. The polymers are likewise prepared via the ATRP process and find use in adhesive and/or sealant formulations. The triblock copolymers described here, compared to the inventive pentablock copolymers of the CABAC or ACBCA form, however, have the disadvantage that either the entire hard or soft segment is functionalized. In the inventive polymers, in contrast, only a short segment of the chain is OH-functionalized, such that the unfunctionalized hard block can contribute to sufficient cohesion and the unfunctionalized soft block to good adhesion. In the case of the ABA triblock copolymers, owing to the functionalization of at least one of the two segments A or B, property losses for one of the two parameters important for adhesives and sealants have to be taken into account. Moreover, through selection of suitable segment lengths, the crosslinking density can be adjusted readily. A further advantage of the inventive pentablock copolymers, especially of the CABAC form, is that, as a result of the functionalization of the intermediate A blocks, the hard blocks (A or B) and soft blocks (correspondingly B or A) are separated from one another in the network, and can thus each contribute to an improvement in the adhesion and cohesion respectively.

PROBLEM

A new stage in the development is that of the pentablock copolymers described below.

It was an object of the invention to prepare pentablock copolymers of the CABAC or ACBCA structure. In particular, there is a need for OH-terminated (meth)acrylates or (meth)acrylates whose properties correspond or approximate very closely to those of OH-terminated materials. This can be achieved, for example, through the incorporation of one to a few OH groups at the chain end. Chain ends refer to the end segment of a polymer, which makes up max. 1% by weight-20% by weight of the total weight of the polymer.

Irrespective of this, there is a need for polymeric block structures which possess unfunctionalized soft segments with high adhesive action, unfunctionalized hard segments with good cohesive action and OH-functionalized segments for subsequent reactions, for example a crosslinking reaction. Such polymers can, in accordance with the invention, be formed by a sequential polymerization to form pentablock structures of the ACBCA or CABAC type.

It is a further object of the invention to provide polymers comprising reactive hydroxy groups as binders such that the number of such groups in the polymer, with good availability for the hardening reaction, is kept as low as possible. A relatively high proportion of polar groups in the binder leads to possible gelation or at least to an additional increase in the melt viscosity of the reactive hotmelt adhesive.

It is a further object of the invention to provide such a material with a very narrow molecular weight distribution below 1.8, preferably below 1.6. In this way, both the proportions of relatively high molecular weight constituents which contribute, inter alia, to an undesired increase in the melt viscosity, and the proportions of particularly low molecular weight constituents, which can cause a deterioration in the solvent resistance of the adhesive composition, are minimized.

It is therefore an object of the present invention to provide, inter alia, a binder which possesses a low number of free hydroxyl groups in two chain segments A. In one embodiment, a pentablock copolymer of the ABCBA form is present, which has the OH groups close to the chain ends. In a second embodiment, the pentablock copolymer is of the CABAC form which contains two OH-functionalized intermediate segments A.

SOLUTION

The object is achieved by providing block copolymers of the CABAC or ACBCA composition with $\leq 8$ OH groups, preferably $\leq 4$ OH groups, in the individual A blocks, characterized in that block A, a copolymer containing hydroxy-functionalized (meth)acrylates and monomers selected from the group of the (meth)acrylates or mixtures thereof, and blocks B and C containing (meth)acrylates or mixtures thereof which have no hydroxyl function, are polymerized as pentablock copolymers.

B describes either a hard (meth)acrylate block, preferably methacrylate block, or a soft (meth)acrylate block, preferably acrylate block. C describes in each case, differently from B, a hard (meth)acrylate block, preferably methacrylate block, or a soft (meth)acrylate block, preferably acrylate block, in which case C is a hard block when B is a soft block or vice versa. A is an OH-functionalized block, in which case the hydroxyl groups are incorporated into the polymer segment by copolymerization of OH-functionalized with non-OH-functionalized monomers. The composition of the non-OH-functionalized monomers may preferably correspond either to the composition of the monomer mixture which is used to form the B block, or to the composition of the monomer mixture which is used to form the C block.

The formulation "soft block" describes polymer segments with a glass transition temperature $T_g$ which is less than 0° C. The formulation "hard block" describes polymer segments with a glass transition temperature $T_g$ greater than 50° C. The glass transition temperature $T_g$ is determined by means of Differential Scanning calorimetry (DSC).

It has been found that ACBCA and CABAC block copolymers with $\leq 2$ OH groups in the individual A blocks can also be prepared.

The block copolymers of the CABAC or ACBCA composition consist of A blocks to an extent of less than 20% of the total weight, preferably less than 10%.

It is possible to add both to the copolymers of block A and to the copolymers of blocks B and C 0% by weight-50% by weight of monomers which are polymerizable by means of ATRP and which do not form part of the group of the (meth) acrylates.

The notation (meth)acrylate represents the esters of (meth) acrylic acid and here means both methacrylate, for example methyl methacrylate, ethyl methacrylate, etc., and acrylate, for example methyl acrylate, ethyl acrylate, etc., and mixtures of the two.

In addition, a process has been developed for preparing block copolymers of the CABAC composition. With a specific form of living polymerization, atom transfer radical polymerization (ATRP), it is possible to incorporate efficiently controlled compositions, architectures and defined functionalities into a polymer.

It has been found that the use of a bifunctional initiator allows a CABAC structure to be formed in a controlled manner.

Hydroxy-functionalized (meth)acrylates which are polymerized into block A are preferably hydroxyalkyl (meth) acrylates of straight-chain, branched or cycloaliphatic diols having 2-36 carbon atoms, for example 3-hydroxypropyl (meth)acrylate, 3,4-dihydroxybutyl mono(meth)acrylate, 2-hydroxyethyl (meth)acrylate, 4-hydroxybutyl (meth)acrylate, 2-hydroxypropyl (meth)acrylate, 2,5-dimethyl-1,6-hexanediol mono(meth)acrylate and more preferably 2-hydroxyethyl methacrylate.

Monomers which are polymerized either into block A or into block B or C are selected from the group of the (meth) acrylates, for example alkyl (meth)acrylates of straight-chain, branched or cycloaliphatic alcohols having 1-40 carbon atoms, for example methyl (meth)acrylate, ethyl (meth) acrylate, n-butyl (meth)acrylate, i-butyl (meth)acrylate, t-butyl (meth)acrylate, pentyl (meth)acrylate, 2-ethylhexyl (meth)acrylate, stearyl (meth)acrylate, lauryl (meth)acrylate, cyclohexyl (meth)acrylate, isobornyl (meth)acrylate, aryl (meth)acrylates, for example benzyl (meth)acrylate or phenyl (meth)acrylate, each of which may be unsubstituted or have mono- to tetrasubstituted aryl radicals, other aromatically substituted (meth)acrylates, for example naphthyl (meth) acrylate, mono(meth)acrylates of ethers, polyethylene glycols, polypropylene glycols or mixtures thereof having 5-80 carbon atoms, for example tetrahydrofurfuryl methacrylate, methoxy(m)ethoxyethyl methacrylate, 1-butoxypropyl methacrylate, cyclohexyloxymethyl methacrylate, benzyloxymethyl methacrylate, furfuryl methacrylate, 2-butoxyethyl methacrylate, 2-ethoxyethyl methacrylate, allyloxymethyl methacrylate, 1-ethoxybutyl methacrylate, 1-ethoxyethyl methacrylate, ethoxymethyl methacrylate, poly(ethylene glycol) methyl ether (meth)acrylate or poly (propylene glycol) methyl ether (meth)acrylate.

In addition to the (meth)acrylates detailed above, the compositions to be polymerized may also have further unsaturated monomers which are copolymerizable with the aforementioned (meth)acrylates and by means of ATRP. These include 1-alkenes, such as 1-hexene, 1-heptene, branched alkenes, for example vinylcyclohexane, 3,3-dimethyl -1-propene, 3-methyl-1-diisobutylene, 4-methyl-1-pentene, acrylonitrile, vinyl esters, for example vinyl acetate, styrene, substituted styrenes with an alkyl substituent on the vinyl group, for example α-methylstyrene and α-ethylstyrene, substituted styrenes with one or more alkyl substituents on the ring, such as vinyltoluene and p-methylstyrene, halogenated styrenes, for example monochlorostyrenes, dichlorostyrenes, tribromostyrenes and tetrabromostyrenes; heterocyclic compounds such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, 9-vinylcarbazole, 3-vinylcarbazole, 4-vinylcarbazole, 2-methyl-1-vinylimidazole, vinyloxolane, vinylfuran, vinylthiophene, vinyithiolane, vinylthiazoles, vinyloxazoles and isoprenyl ethers; maleic acid derivatives, for example maleic anhydride, maleimide, methylmaleimide and dienes, for example divinylbenzene, and also, in the A blocks, the particular hydroxy-functionalized and/or amino-functionalized and/or mercapto-functionalized compounds. In addition, these copolymers may also be prepared such that they have a hydroxyl and/or amino and/or mercapto functionality in a substituent. Such monomers are, for example, vinylpiperidine, 1-vinylimidazole, N-vinylpyrrolidone, 2-vinylpyrrolidone, N-vinylpyrrolidine, 3-vinylpyrrolidine, N-vinylcaprolactam, N-vinylbutyrolactam, hydrogenated vinylthiazoles and hydrogenated vinyloxazoles. Particular preference is given to copolymerizing vinyl esters, vinyl ethers, fumarates, maleates, styrenes or acrylonitriles with the A blocks and/or B blocks.

The process can be carried out in any halogen-free solvents. Preference is given to toluene, xylene, $H_2O$; acetates, preferably butyl acetate, ethyl acetate, propyl acetate; ketones, preferably ethyl methyl ketone, acetone; ethers; aliphatics, preferably pentane, hexane, but also biodiesel.

The block copolymers of the CABAC composition are prepared by means of sequential polymerization.

In addition to solution polymerization, the ATRP can also be carried out as an emulsion, miniemulsion, microemulsion, suspension or bulk polymerization.

The polymerization can be carried out at standard pressure, reduced pressure or elevated pressure. The polymerization temperature too is uncritical. In general, however, it is in the range of −20° C. to 200° C., preferably of 0° C. to 130° C. and more preferably of 50° C. to 120° C.

The inventive polymer preferably has a number-average molecular weight between 5000 g/mol and 120 000 g/mol, more preferably $\leq$50 000 g/mol and most preferably between 7500 g/mol and 25 000 g/mol.

It has been found that the molecular weight distribution is below 1.8, preferably below 1.6, more preferably below 1.4 and ideally below 1.3.

The bifunctional initiators used may be $RO_2C$—CHX—$(CH_2)_n$—CHX—$CO_2R$, $RO_2C$—$C(CH_3)X$—$(CH_2)_n$—$C(CH_3)X$—$CO_2R$, $RO_2C$—$CX_2$—$(CH_2)_n$—$CX_2$—$CO_2R$, RC(O)—CHX—$(CH_2)_n$—CHX—C(O)R, RC(O)—$C(CH_3)$X—$(CH_2)_n$—$C(CH_3)_3$X—C(O)R, RC(O)—$CX_2$—$(CH_2)_n$—$CX_2$—C(O)R, $XCH_2$—$CO_2$—$(CH_2)_n$—$OC(O)CH_2X$, $CH_3CHX$—$CO_2$—$(CH_2)_n$—$OC(O)CHXCH_3$, $(CH_3)_2CX$—$CO_2$—$(CH_2)_n$—$OC(O)CX(CH_3)_2$, $X_2CH$—$CO_2$—$(CH_2)_n$—$OC(O)CHX_2$, $CH_3CX_2$—$CO_2$—$(CH_2)_n$—$OC(O)CX_2CH_3$, $XCH_2C(O)C(O)CH_2X$, $CH_3CHXC(O)C(O)CHXCH_3$, $XC(CH_3)_2C(O)C(O)CX(CH_3)_2$, $X_2CHC(O)C(O)CHX_2$, $CH_3CX_2C(O)C(O)CX_2CH_3$, $XCH_2$—C(O)—$CH_2X$, $CH_3$—CHX—C(O)—CHX—$CH_3$, $CX(CH_3)_2$—C(O)—CX$(CH_3)_2$, $X_2CH$—C(O)—$CHX_2$, $C_6H_5$—CHX—$(CH_2)_n$—CHX—$C_6H_5$, $C_6H_5$—$CX_2$—$(CH_2)_n$—$CX_2$—$C_6H_5$, $C_6H_5$—$CX_2$—$(CH_2)_n$—$CX_2$—$C_6H_5$, o,- m- or p-$XCH_2$-Ph-$CH_2X$, o,- m- or p-$CH_3CHX$-Ph-$CHXCH_3$, o,- m- or p-$(CH_3)_2CX$-Ph-$CX(CH_3)_2$, o,- m- or p-$CH_3CX_2$-Ph-$CX_2CH_3$, o,- m- or p-$X_2CH$-Ph-$CHX_2$, o,- m- or p-$XCH_2$—$CO_2$-Ph-OC(O)$CH_2X$, o,- m- or p-$CH_3CHX$—$CO_2$-Ph-OC(O)$CHXCH_3$, o,- m- or p-$(CH_3)_2CX$—$CO_2$-Ph-OC(O)$CX(CH_3)_2$, $CH_3CX_2$—$CO_2$-Ph-OC(O)$CX_2CH_3$, o,- m- or p-$X_2CH$—$CO_2$-Ph-OC(O)$CHX_2$ or o,- m- or p-$XSO_2$-Ph-$SO_2X$ (X is chlorine, bromine or iodine; Ph is phenylene ($C_6H_4$); R represents an aliphatic radical which is composed of 1 to 20 carbon atoms and may be linear or branched or else of cyclic structure, may be saturated or mono- or polyunsaturated and may contain one or more aromatic rings or else is aromatic-free, and n is from 0 to 20). Preference is given to using 1,4-butanediol di(2-bromo-2-methylpropionate), 1,2-ethylene glycol di(2-bromo-2-methylpropionate), diethyl 2,5-dibromoadipate or diethyl 2,3-dibromomaleate. The ratio of initiator to monomer gives the later molecular weight, if all of the monomer is converted.

Catalysts for ATRP are listed in Chem. Rev. 2001, 101, 2921. Predominantly copper complexes are described—but other compounds employed also include iron, rhodium, platinum, ruthenium or nickel compounds. In general, it is possible to use all transition metal compounds which can form a redox cycle with the initiator, or the polymer chain which has a transferable atom group. For this purpose, copper can be supplied to the system, for example, proceeding from $Cu_2O$, CuBr, CuCl, CuI, $CuN_3$, CuSCN, CuCN, $CuNO_2$, $CuNO_3$, $CuBF_4$, $Cu(CH_3COO)$ or $Cu(CF_3COO)$.

One alternative to the ATRP described is a variant thereof: in so-called reverse ATRP, compounds in higher oxidation states, for example $CuBr_2$, $CuCl_2$, CuO, $CrCl_3$, $Fe_2O_3$ or $FeBr_3$, can be used. In these cases, the reaction can be initiated with the aid of classic free-radical formers, for example AIBN. This first reduces the transition metal compounds, since they are reacted with the free radicals formed from the classic free-radical formers. Reverse ATRP has been described, inter alia, by Wang and Matyjaszewski in Macromolekules (1995), vol. 28, p. 7572ff.

One variant of reverse ATRP is that of the additional use of metals in the zero oxidation state. Presumable comproportionation with the transition metal compounds of the higher oxidation state brings about an acceleration of the reaction rate. This process is described in detail in WO 98/40415.

The molar ratio of transition metal to bifunctional initiator is generally in the range of 0.02:1 to 20:1, preferably in the range of 0.02:1 to 6:1 and more preferably in the range of 0.2:1 to 4:1, without any intention that this should impose a restriction.

In order to increase the solubility of the metals in organic solvents and simultaneously to prevent the formation of stable and hence polymerization-inactive organometallic compounds, ligands are added to the system. In addition, the ligands facilitate the abstraction of the transferable atom group by the transition metal compound. A list of known ligands can be found, for example, in WO 97/18247, WO 97/47661 or WO 98/40415. As a coordinative constituent, the compounds used as a ligand usually have one or more nitrogen, oxygen, phosphorus and/or sulphur atoms. Particular preference is given to nitrogen compounds. Very particular preference is given to nitrogen chelate ligands. Examples include 2,2'-bipyridine, N,N,N',N'',N''-pentamethyldiethylenetriamine (PMDETA), tris(2-aminoethyl)amine (TREN), N,N,N',N'-tetramethylethylenediamine or 1,1,4,7,10,10-hexamethyltriethylenetetramine. Valuable information regarding the selection and combination of the individual components can be found by the person skilled in the art in WO 98/40415.

These ligands can form coordination compounds with the metal compounds in situ or they can first be prepared as coordination compounds and then added to the reaction mixture.

The ratio of ligand (L) to transition metal depends on the denticity of the ligand and the coordination number of the transition metal (M). In general, the molar ratio is in the range of 100:1 to 0.1:1, preferably 6:1 to 0.1:1 and more preferably 3:1 to 1:1, without any intention that this should impose a restriction.

On completion of ATRP, the transition metal compound can be precipitated by means of addition of a suitable sulphur compound. By means of addition, for example, of mercaptans, the chain-terminal halogen atom is substituted with release of a hydrogen halide. The hydrogen halide—for example HBr—protonates the ligand L which coordinates to the transition metal to give an ammonium halide. As a result of this operation, the transition metal-ligand complex is quenched, and the "naked" metal is precipitated. Subsequently, the polymer solution can be purified easily by a simple filtration. Said sulphur compounds are preferably compounds with an SH group. Most preferably, they are one of the regulators known from free-radical polymerization, such as mercaptoethanol, ethylhexyl mercaptan, n-dodecyl mercaptan or thioglycolic acid.

From the inventive copolymers, it is possible to produce, for example, adhesives, sealant compositions, coating compositions or casting compositions. The use of the copolymers allows elasticity or cohesion of such end products to be improved. Furthermore, very good adhesion is observed on various substrates.

A further advantage of the block copolymers is the colourlessness and the odourlessness of the product produced.

The inventive pentablock copolymers bearing OH groups can be converted further in subsequent processes known to those skilled in the art. For example, the OH groups can be reacted with low molecular weight compounds which, in addition to a group reactive with OH groups, for example an NCO group, have a further functional group which is stable under the reaction conditions. Such functional groups are, for example, anhydride groups, acid groups, silyl groups, epoxy groups or isocyanate groups. As a result of this additional process step, it is possible to obtain pentablock copolymers with other functional groups.

There is thus a wide field of application for these products. The selection of the application examples is not capable of restricting the use of the inventive polymers. The examples are intended to serve merely to illustrate the wide possible uses of the polymers described by way of a random sample. Preference is given to using block copolymers of the CABAC composition or of the ACBCA composition as prepolymers in reactive hotmelt adhesives, other hotmelt adhesives, coating compositions, primer coats, PSAs (pressure-sensitive adhesives), adhesive compositions or sealant compositions. The block copolymers of the CABAC or ACBCA composition may also find use as additives. One example of this would be addition as an impact modifier to adhesives or sealants.

The examples given below are given for better illustration of the present invention, but are not capable of restricting the invention to the features disclosed herein.

EXAMPLES

The number-average molecular weight $M_n$ and the weight-average molecular weight $M_w$ and the molecular weight distribution D are measured by means of gel permeation chromatography (GPC) against a PMMA calibration.

Examples 1-2

A jacketed vessel equipped with stirrer, thermometer, reflux condenser, nitrogen inlet tube and dropping funnel was initially charged, under an $N_2$ atmosphere, with monomer I (exact name and amount in Table 2), butyl acetate, 0.9 g of copper(I) oxide and 2.3 g of PMDETA. The solution is stirred at 60° C. for 15 min. Subsequently, at the same temperature, the initiator 1,4-butanediol di(2-bromo-2-methylpropionate) (BDBIB), dissolved in butyl acetate, is added dropwise. After the polymerization time of 3 hours, a sample is taken to determine the mean molar mass $M_n$ (by means of SEC), and monomer II (exact name and amount in Table 2) is added. After a calculated 98% conversion, a further sample is finally taken for an SEC measurement and the mixture of monomer III and monomer F (exact name and amount in Table 2) is added. The mixture is polymerized up to an expected conversion of at least 98% and then stopped by means of introduction of atmospheric oxygen for about five minutes. Subsequently, 5 g of n-dodecyl mercaptan are added. The solution, which had been greenish beforehand, turns red spontaneously and a red solid precipitates out. The filtration is effected by means of an elevated pressure filtration. The solution is admixed with 50 g of Tonsil Optimum 210 FF (from Südchemie), stirred for 30 min and then filtered under elevated pressure through an activated carbon filter (AKS 5 from Pall Seitz Schenk). The mean molecular weight and the molecular weight distribution are finally determined by SEC measurements.

Examples 3-4

A jacketed vessel equipped with stirrer, thermometer, reflux condenser, nitrogen inlet tube and dropping funnel was initially charged, under an $N_2$ atmosphere, with monomer I (exact name and amount in Table 2), butyl acetate, 0.9 g of copper(I) oxide and 2.3 g of PMDETA. The solution is stirred at 60° C. for 15 min. Subsequently, at the same temperature, the initiator 1,4-butanediol di(2-bromo-2-methylpropionate) (BDBIB), dissolved in 10 ml of butyl acetate, is added dropwise. After a polymerization time of 3 hours, a sample is taken to determine the mean molar mass $M_n$ (by means of SEC), and a mixture of monomer II and monomer F (exact name and amount in Table 2) is added. After a calculated 98% conversion, a further sample is finally taken for an SEC measurement and monomer III (exact name and amount in Table 2) is added. The mixture is polymerized up to an expected conversion of at least 98% and then stopped by means of introduction of atmospheric oxygen for about five minutes. Subsequently, 5 g of n-dodecyl mercaptan are added. The solution, which had been greenish beforehand, turns red spontaneously and a red solid precipitates out. The filtration is effected by means of an elevated pressure filtration. The solution is admixed with 50 g of Tonsil Optimum 210 FF (from Südchemie), stirred for 30 min and then filtered under elevated pressure through an activated carbon filter (AKS 5 from Pall Seitz Schenk). The mean molecular weight and the molecular weight distribution are finally determined by SEC measurements.

TABLE 1

| Example | 1 | 2 | 3 | 4 |
| --- | --- | --- | --- | --- |
| Monomer I | n-BA | MMA | n-BA | MMA |
| Amount | 41.02 g | 41.65 g | 41.80 g | 41.55 g |
| Monomer II | MMA | n-BA | MMA | MMA |
| Amount | 41.02 g | 41.65 g | 41.23 g | 41.37 g |
| Monomer III | MMA | n-BA | MMA | n-BA |
| Amount | 14.66 g | 14.88 g | 14.85 g | 14.85 g |
| Monomer F | HEMA | HEMA | HEMA | HEMA |
| Amount | 3.30 g | 3.25 g | 3.30 g | 3.30 g |
| Amount of initiator | 2.33 g | 2.55 g | 2.45 g | 2.48 g |
| $M_n$ (1st stage) | 9300 | 8800 | 9100 | 8700 |
| $M_n$ (2nd stage) | 13300 | 15500 | 13600 | 15700 |
| $M_n$ (end product) | 17900 | 18200 | 17200 | 17800 |
| D | 1.33 | 1.28 | 1.33 | 1.28 |

MMA = methyl methacrylate; n-BA = n-butyl acrylate, HEMA = 2-hydroxyethyl methacrylate

The invention claimed is:

1. A process for preparing pentablock copolymers functionalized with OH groups, wherein
    exactly two blocks containing hydroxy-functionalized (meth)acrylates and monomers selected from the group consisting of the non-hydroxy-functionalized (meth)acrylates or mixtures thereof and
    the three other blocks containing (meth)acrylates or mixtures thereof, which have no hydroxyl function and among which two blocks in turn are of corresponding composition and the third block has a different composition,
    are prepared as pentablock copolymers,
    wherein said pentablock copolymers comprise at least one A block which is composed of hydroxy-functionalized (meth)acrylates and monomers selected from the group consisting of the non-hydroxy-functionalized (meth)acrylates or mixtures thereof and said A blocks of the pentablock copolymer contain ≦8 hydroxyl groups.

2. The process for preparing pentablock copolymers functionalized with OH groups according to claim 1, wherein
    the pentablock copolymer is a block copolymer of the CABAC form,
    the A blocks are composed of hydroxy-functionalized (meth)acrylates and monomers selected from the group consisting of the non-hydroxy-functionalized (meth)acrylates or mixtures thereof, and
    blocks B and C are composed of (meth)acrylates or mixtures thereof, which have no hydroxyl function.

3. The process for preparing pentablock copolymers functionalized with OH groups according to claim 2, wherein the composition of the non-OH-functionalized fraction in the A blocks corresponds to the composition of the C blocks.

4. The process for preparing pentablock copolymers functionalized with OH groups according to claim 2, wherein the composition of the non-OH-functionalized fraction in the A blocks corresponds to the composition of the B blocks.

5. The process for preparing pentablock copolymers functionalized with OH groups according to claim 2, wherein the glass transition temperature of the B block is greater than 50° C. and the glass transition temperature of the C blocks is less than 0° C.

6. The process for preparing pentablock copolymers functionalized with OH groups according to claim 2, wherein the glass transition temperature of the C blocks is greater than 50° C. and the glass transition temperature of the B block is less than 0° C.

7. The process for preparing pentablock copolymers functionalized with OH groups according to claim 2, wherein the individual A blocks of the CABAC block copolymers have a composition with ≦2OH groups.

8. The process for preparing pentablock copolymers functionalized with OH groups according to claim 2, wherein the individual A blocks make up less than 20% of the total weight of the CABAC block copolymer.

9. The process for preparing pentablock copolymers functionalized with OH groups according to claim 8, wherein the individual A blocks make up less than 10% of the total weight of the CABAC block copolymer.

10. The process for preparing pentablock copolymers functionalized with OH groups according to claim 1, wherein
    the pentablock copolymer is a block copolymer of the ACBCA form,
    the A blocks are composed of hydroxy-functionalized (meth)acrylates and monomers selected from the group consisting of the non-hydroxy-functionalized (meth)acrylates or mixtures thereof, and
    blocks B and C are composed of (meth)acrylates or mixtures thereof, which have no hydroxyl function.

11. The process for preparing pentablock copolymers functionalized with OH groups according to claim 10, wherein the composition of the non-OH-functionalized fraction in the A blocks corresponds to the composition of the C blocks.

12. The process for preparing pentablock copolymers functionalized with OH groups according to claim 10, wherein the composition of the non-OH-functionalized fraction in the A blocks corresponds to the composition of the B blocks.

13. The process for preparing pentablock copolymers functionalized with OH groups according to claim 10, wherein the glass transition temperature of the B block is greater than 50° C. and the glass transition temperature of the C blocks is less than 0° C.

14. The process for preparing pentablock copolymers functionalized with OH groups according to claim 10, wherein the glass transition temperature of the C blocks is greater than 50° C. and the glass transition temperature of the B block is less than 0° C.

15. The process for preparing pentablock copolymers functionalized with OH groups according to claim 10, wherein the individual A blocks of the ACBCA block copolymers have a composition with $\leq 2$ OH groups.

16. The process for preparing pentablock copolymers functionalized with OH groups according to claim 10, wherein the individual A blocks make up less than 20% of the total weight of the ACBCA block copolymer.

17. The process for preparing pentablock copolymers functionalized with OH groups according to claim 16, wherein the individual A blocks make up less than 10% of the total weight of the ACBCA block copolymer.

18. The process for preparing pentablock copolymers functionalized with OH groups according to claim 1, wherein the block copolymers contain monomers which are polymerizable by means of ATRP and do not form part of the group of the (meth)acrylates in the A blocks and/or B block and/or C blocks.

19. The process for preparing pentablock copolymers functionalized with OH groups according to claim 18, wherein the block copolymers contain monomers which are polymerizable by means of ATRP and do not form part of the group of the (meth)acrylates in the A blocks and/or B block and/or C blocks in an amount not to exceed 50% by weight.

20. The process for preparing pentablock copolymers functionalized with OH groups according to claim 1, wherein the hydroxy-functionalized (meth)acrylates are selected from the group consisting of hydroxyalkyl (meth)acrylates of straight-chain, branched or cycloaliphatic diols having 2-36 carbon atoms.

21. The process for preparing pentablock copolymers functionalized with OH groups according to claim 1, wherein the (meth)acrylates are selected from the group consisting of alkyl (meth)acrylates of straight-chain, branched or cycloaliphatic alcohols having 1-40 carbon atoms, -aryl (meth)acrylates which may be unsubstituted or have mono- to tetrasubstituted aryl radicals, mono(meth)acrylates of ethers, polyethylene glycols, polypropylene glycols and mixtures thereof having 5-80 carbon atoms.

22. The process for preparing pentablock copolymers functionalized with OH groups according to claim 1, wherein the pentablock copolymers are prepared by means of atom transfer radical polymerization (ATRP) in the presence of an initiator and of a catalyst in a halogen-free solvent.

23. The process for preparing pentablock copolymers according to claim 22, wherein the initiator is a bifunctional initiator.

24. The process for preparing pentablock copolymers according to claim 23, wherein the bifunctional initiator is selected from the group consisting of 1,4-butanediol di(2-bromo-2-methylpropionate), 1,2-ethylene glycol di(2-bromo-2-methylpropionate), diethyl 2,5-dibromoadipate and diethyl 2,3-dibromomaleate.

25. The process for preparing pentablock copolymers according to claim 22, wherein the pentablock copolymer is prepared by means of sequential polymerization.

26. The process for preparing pentablock copolymers according to claim 22, wherein the catalysts used are transition metal compounds.

27. The process for preparing pentablock copolymers according to claim 26, wherein the catalysts used are copper compounds.

28. The process for preparing pentablock copolymers according to claim 22, wherein the catalyst, before the polymerization, is combined with a nitrogen, oxygen, sulphur or phosphorus compound which can enter into one or more coordinate bonds with the transition metal to form a metal-ligand complex.

29. The process for preparing pentablock copolymers according to claim 28, wherein the ligands used are N-containing chelate ligands.

30. The process for preparing pentablock copolymers according to claim 29, wherein the ligand used is 2,2'-bipyridine, N,N,N',N'',N''-pentamethyldiethylenetriamine (PMDETA), tris(2-aminoethyl)amine (TREN), N,N,N',N'-tetramethylethylenediamine or 1,1,4,7,10,10-hexamethyltriethylenetetramine.

31. The process for preparing pentablock copolymers according to claim 22, wherein the block copolymer has a number-average molecular weight between 5000 g/mol and 100 000 g/mol.

32. The process for preparing pentablock copolymers according to claim 31, wherein the block copolymer has a number-average molecular weight between 7500 g/mol and 50 000 g/mol.

33. The process for preparing pentablock copolymers according to claim 22, wherein the catalyst, after the polymerization, is precipitated by means of the addition of a sulphur compound and removed from the polymer solution by means of filtration.

34. The process for preparing pentablock copolymers according to claim 33, wherein the sulphur compound is a mercaptan or a compound having a thiol group.

35. The process according to claim 1, wherein the OH groups of the polymer are reacted with low molecular weight compounds which, in addition to a group reactive with OH groups, have an anhydride, acid, isocyanate, epoxide or silyl group.

36. A pentablock copolymer functionalized with OH groups which is obtained by the process described in claim 1, wherein said copolymer is composed of
    exactly two blocks containing hydroxy-functionalized (meth)acrylates and monomers selected from the group consisting of the non-hydroxy-functionalized (meth)acrylates or mixtures thereof and
    exactly three blocks containing (meth)acrylates or mixtures thereof, which have no hydroxyl function and among which two blocks in turn are of corresponding composition and the third block has a different composition,
    wherein said pentablock copolymer comprises at least one A block which is composed of hydroxy-functionalized (meth)acrylates and monomers selected from the group consisting of the non-hydroxy-functionalized (meth) acrylates or mixtures thereof and said A blocks of the pentablock copolymer contain $\leq 8$ hydroxyl groups.

37. A pentablock copolymer functionalized with OH groups which is obtained by the process described in claim 2, wherein
the pentablock copolymer is a block copolymer of the CABAC form,
the A blocks are composed of hydroxy-functionalized (meth)acrylates and monomers selected from the group consisting of the non-hydroxy-functionalized (meth)acrylates or mixtures thereof, and
blocks B and C are composed of (meth)acrylates, or mixtures thereof, which have no hydroxyl function.

38. A pentablock copolymer functionalized with OH groups which is obtained by the process described in claim 10, wherein
the pentablock copolymer is a block copolymer of the ACBCA form,
the A blocks are composed of hydroxy-functionalized (meth)acrylates and monomers selected from the group consisting of the non-hydroxy-functionalized (meth)acrylates or mixtures thereof, and
blocks B and C are composed of (meth)acrylates, or mixtures thereof, which have no hydroxyl function.

39. A hotmelt or reactive hotmelt adhesive, a coating material, a primer coat, a pressure-sensitive adhesive, a reactive adhesive, an adhesive composition, a sealant composition, and an impact modifier in an adhesive or a sealant composition comprising block copolymers of an CABAC composition with OH groups in the individual A blocks, wherein
the A blocks are a copolymer comprising hydroxy-functionalized (meth)acrylates and monomers selected from the group of the non-hydroxy-functionalized (meth)acrylates or mixtures thereof and said A blocks contain $\leqq 8$ hydroxyl groups, and
the B and C blocks comprise (meth)acrylates, or mixtures thereof, which have no hydroxyl function.

40. A hotmelt or reactive hotmelt adhesive, a coating material, a primer coat, a pressure-sensitive adhesive, a reactive adhesive, an adhesive composition, a sealant composition, and an impact modifier in an adhesive or a sealant composition comprising block copolymers of an ACBCA composition with OH groups in the individual A blocks, wherein
the A blocks are a copolymer comprising hydroxy-functionalized (meth)acrylates and monomers selected from the group of the non-hydroxy-functionalized (meth)acrylates or mixtures thereof and said A blocks contain $\leqq 8$ hydroxyl groups, and
the B and C blocks comprise (meth)acrylates, or mixtures thereof, which have no hydroxyl function.

41. The process of claim 1, wherein said A blocks contain $\leqq 4$ hydroxyl groups.

42. The pentablock copolymer of claim 36, wherein said A blocks contain $\leqq 4$ hydroxyl groups.

43. The hotmelt or reactive hotmelt adhesive of claim 39, wherein said A blocks contain $\leqq 4$ hydroxyl groups.

44. The hotmelt or reactive hotmelt adhesive of claim 40, wherein said A blocks contain $\leqq 4$ hydroxyl groups.

* * * * *

UNITED STATES PATENT AND TRADEMARK OFFICE
CERTIFICATE OF CORRECTION

PATENT NO. : 8,034,879 B2
APPLICATION NO. : 12/674552
DATED : October 11, 2011
INVENTOR(S) : Sven Balk et al.

Page 1 of 1

It is certified that error appears in the above-identified patent and that said Letters Patent is hereby corrected as shown below:

On the title page, Item (73), the second Assignee's name is incorrect. Item (73) should read:

-- (73) Assignee: Evonik Roehm GmbH, Darmstadt (DE); Henkel AG & Co. KGAA, Duesseldorf (DE) --

Signed and Sealed this
Thirteenth Day of December, 2011

David J. Kappos
*Director of the United States Patent and Trademark Office*